(12) United States Patent
Keller et al.

(10) Patent No.: US 7,789,564 B2
(45) Date of Patent: Sep. 7, 2010

(54) LINEAR ROLLER BEARING

(75) Inventors: Peter Keller, Bruchmuehlbach-Miesau (DE); Dietmar Rudy, Kleinbundenbach (DE)

(73) Assignee: Schaeffler KG, Herzogenaurach (DE)

( * ) Notice: Subject to any disclaimer, the term of this patent is extended or adjusted under 35 U.S.C. 154(b) by 519 days.

(21) Appl. No.: 11/814,858

(22) PCT Filed: Dec. 17, 2005

(86) PCT No.: PCT/EP2005/013637

§ 371 (c)(1),
(2), (4) Date: Aug. 15, 2007

(87) PCT Pub. No.: WO2006/079397

PCT Pub. Date: Aug. 3, 2006

(65) Prior Publication Data
US 2008/0131037 A1 Jun. 5, 2008

(30) Foreign Application Priority Data
Jan. 27, 2005 (DE) .................. 10 2005 003 710

(51) Int. Cl.
*F16C 29/06* (2006.01)
(52) U.S. Cl. .................. 384/15; 384/43; 384/45
(58) Field of Classification Search ............. 384/12–13, 384/15, 16, 43–45, 49, 51
See application file for complete search history.

(56) References Cited

U.S. PATENT DOCUMENTS

| 3,583,774 | A | * | 6/1971 | De Gast | 384/12 |
| 4,886,376 | A | * | 12/1989 | Osawa | 384/15 |
| 5,087,130 | A | * | 2/1992 | Tsukada | 384/45 |
| 5,186,544 | A | * | 2/1993 | Eder et al. | 384/15 |
| 5,399,023 | A | * | 3/1995 | Winkelmann et al. | 384/13 |
| 5,531,521 | A | | 7/1996 | Ochiai et al. | |
| 5,547,285 | A | * | 8/1996 | Hutzel et al. | 384/15 |
| 5,556,206 | A | * | 9/1996 | Bigwood | 384/15 |
| 5,590,965 | A | | 1/1997 | Yabe et al. | |
| 5,634,722 | A | * | 6/1997 | Yuasa et al. | 384/44 |
| 5,775,813 | A | * | 7/1998 | Saitoh | 384/15 |
| 6,007,607 | A | * | 12/1999 | Becker et al. | 95/278 |
| 6,135,638 | A | * | 10/2000 | Agari | 384/43 |
| 6,155,717 | A | * | 12/2000 | Michioka et al. | 384/15 |
| 6,401,867 | B1 | * | 6/2002 | Michioka et al. | 384/13 |
| 6,435,718 | B1 | * | 8/2002 | Weiss et al. | 384/13 |
| 6,877,900 | B2 | * | 4/2005 | Mochizuki et al. | 384/15 |

FOREIGN PATENT DOCUMENTS

| DE | 94 22 394 A | 7/2001 |
| DE | 10243871 Y | 4/2003 |
| DE | 103 07882 Y | 9/2004 |
| EP | 0 810 380 A | 12/1997 |

* cited by examiner

*Primary Examiner*—Marcus Charles
(74) *Attorney, Agent, or Firm*—Lucas & Mercanti, LLP

(57) ABSTRACT

A linear rolling bearing, which has a guide carriage that is mounted by rolling bearings on a guide rail, and which has a scraper arranged at least one end side of the guide carriage for scraping foreign objects such as chips, dust and cooling liquids from the guide rail. The scraper is in scraping contact, by its scraping system, preferably by a sealing lip or sealing edge, with the guide rail. The scraper has a first stop for abutment against the guide rail, with the abutment of the first stop indicating an impermissible position of the scraper on the guide rail.

15 Claims, 3 Drawing Sheets

LINEAR ROLLER BEARING

BACKGROUND OF THE INVENTION

The present invention relates to a linear rolling bearing, having a guide carriage which is of approximately u-shaped design and engages with its two limbs around a guide rail.

U.S. Pat. No. 5,590,965 A, for example, discloses a linear rolling bearing whose guide carriage, which is of u-shaped design, is placed onto a guide rail. The two limbs of the guide carriage engage around the guide rail which has an upper side and, situated opposite one another, two longitudinal sides. The two longitudinal sides are, in each case, provided with a plurality of ball grooves for balls. The two limbs of the guide carriage are likewise provided, on their sides which face one another, with ball grooves, with the ball grooves of the guide carriage and the ball grooves on the running rail forming load channels for the balls. In the load channel, the balls transmit loads between the guide rail and the guide carriage. The raceways in the known linear rolling bearing are aligned in an X-arrangement. Equivalent linear rolling bearings are known in which the raceways are arranged in an O-arrangement with one another. If a vertical force engages on the guide carriage, which pulls the guide carriage away from the guide rail, the balls of the lower load channel transmit this tensile force, with the upper quarter of the ball grooves formed on the guide rail accepting the tensile forces. The ball grooves can accordingly be referred to as a tension raceway.

If a compressive force is exerted on the guide carriage, the balls of both of the load channels transmit this compressive force.

The guide carriage is provided at its two end sides with, in each case, one scraper for scraping foreign objects such as chips, dust and cooling liquids from the guide rail. The scraper has a scraping system which can be formed by a sealing lip or a sealing edge. The scraping system is in scraping contact with the longitudinal sides and the upper side of the guide rail. For this purpose, the scraper, on its scraping system, has a contour which is matched to the guide rail, so that the scraping system also engages into the ball grooves.

When the guide carriage is mounted onto the guide rail, it is to be ensured that the scraper with its scraping system is aligned correctly with respect to the guide rail. This is necessary, in order to ensure correct scraping contact of the scraper with the guide rail. Only when the scraper is positioned correctly can it be fixed to the guide carriage.

If the scraping system is formed by a sealing lip, the sealing lip bears, with slight elastic preload, both against the upper side and also against the two longitudinal sides of the guide rail. If consideration is given to that part of the sealing lip which bears against both longitudinal sides of the guide rail without considering that part of the sealing lip which bears against the upper side of the guide rail, the elastic restoring forces of the sealing lip which bears against both sides of the guide rail are in force equilibrium. It is possible that correct positioning of the scraper is given on account of the force equilibrium. In reality, however, the elastic restoring forces of that part of the sealing lip which is pressed against the upper side of the guide rail are also active. The restoring force of the sealing lip which is active here pulls the scraper upward, so that those parts of the sealing lip which are pressed against the longitudinal sides of the guide rail are likewise pulled upward. This means, however, that those parts of the sealing lip which engage into the tension raceway of the guide rail are impermissibly pushed together. A correct action of the scraper is therefore not ensured. If the scraper is fixed to the guide carriage in this incorrect position, this results at least in considerably increased wear of the sealing lips in the region of the tension raceway.

The problem can also occur in the case of linear rolling bearings which are mounted in only one plane.

SUMMARY OF THE INVENTION

It is an object of the present invention to specify a linear rolling bearing, which has a guide carriage that is mounted by means of rolling bearings on a guide rail; and which has a scraper arranged at at least one end side of the guide carriage for scraping foreign objects such as chips, dust and cooling liquids from the guide rail, with the scraper being in scraping contact, by means of a scraping system with the guide rail, in which simple alignment of the scraper with respect to the guide rail is possible.

According to the invention, the object is achieved in that the scraper has a first stop for abutment against the guide rail, with the abutment of the first stop indicating an impermissible position of the scraper on the guide rail.

If the first stop, as described, abuts in the one direction, it can be expedient to provide a second stop for abutment against the guide rail, with the abutment of the second stop likewise indicating an impermissible position of the scraper on the guide rail. The second stop then acts in the same axis as the first stop but in the opposite direction. When aligning the scraper on the guide rail, it is possible during adjustment for firstly the one and then the other stop to be abutted. It is then possible, with the knowledge of the two abutment situations, to attain a central position of the scraper with respect to the guide rail, with it being possible for the scraper to be fixed to the guide carriage in the central position.

The stop according to the invention is particularly suitable for linear rolling bearings in which the guide carriage is of approximately u-shaped design and engages with its two limbs around the guide rail. The guide rail has an upper side and two longitudinal sides, with the longitudinal sides being provided with raceways for the rolling bodies. Raceways are likewise provided on the limbs of the guide carriage, which raceways, together with the raceways of the guide rail, delimit load channels for the rolling bodies. The scraper is in scraping contact with the longitudinal sides and with the upper side of the guide rail.

When the scraper is aligned on the guide rail, it is for example possible for the scraper, on account of the elastic return forces of the sealing lip which is in scraping contact with the upper side of the guide rail, to be displaced so far upward that the first stop abuts against the guide rail. It can then be sufficient to retract the scraper slightly, so that the stop is free again. The scraper can then be fixed to the guide carriage.

The first stop can for example be designed so as to abut against the tension raceway of the guide rail.

The second stop can be designed so as to abut against the upper side of the guide rail.

It is expedient for the scraping system to project beyond the stop in directions of the guide rail. It is sufficient for the scraping system to project beyond the stop by a few tenths of a millimeter. This ensures that no excessive deformation of the scraping system occurs even in the abutment situation.

Linear rolling bearings according to the invention can for example have four load channels which are in an X-arrangement or O-arrangement with one another. The first stop can then be formed in a simple manner so as to abut against the respective tension raceway of the load channel. If tensile loadings of the guide carriage are transmitted by the rolling bodies into the first load channels, then compressive loadings of the guide carriage can be transmitted by the rolling bodies into the second load channels.

The approximately u-shaped scraper is in scraping contact, preferably at its two limbs, with the longitudinal sides of the guide rail, and, by means of its transverse web which connects the two limbs, with the upper side of the guide rail. With this design, the already previously described advantageous designs can be implemented without problems.

The scraper can have a plate-shaped seal which is provided with the scraping system. Since these seals are often formed from a flexible, elastic material, it can be expedient if the scraper has a rigid support plate as a support for the seal. One refinement according to the invention provides that the support plate is additionally provided with the first and with the second stop. The support plate accordingly assumes several functions which are provided without great expenditure.

If the guide rail is provided at each longitudinal side for example with two ball grooves, the scraper can be provided with lugs which engage between and into the two ball grooves. The lugs of the support plate can be provided in each case with the first stop.

The lugs of the seal can be in scraping contact, by means of their scraping system, with the raceways of the guide carriage. It can also be expedient here for the scraper system, in the region of the lugs, to project slightly beyond the first stop provided on the lug of the support plate. The support plate and the seal can be connected to one another in a form-fitting manner, so as to ensure positive alignment of the support plate and the seal relative to one another.

It has already been explained further above that the scraper can be of unshaped design. In this case, the support plate can be provided with the second stop on its transverse web which engages over the guide rail at its upper side. The second stop can then abut without problems against the upper side of the guide rail when aligning the scraper.

The invention is explained in more detail below on the basis of an exemplary embodiment which is depicted in a total of four figures, in which:

DETAILED DESCRIPTION OF THE DRAWING

Figure 4:
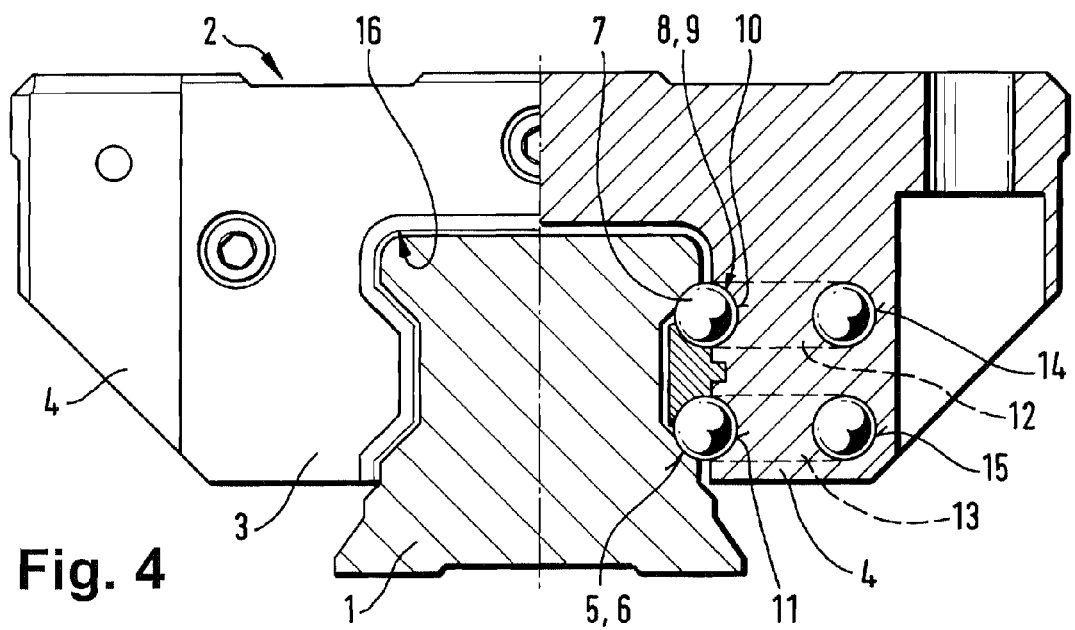
FIG. 4 shows a linear rolling bearing according to the invention, partially in section.

The linear rolling bearing according to the invention depicted in FIG. 4 has a guide carriage 2 which is guided in a longitudinally moveable manner on a guide rail 1. Scrapers 3 are detachably fastened to both end sides of the guide carriage 2. The guide carriage 2 has a substantially u-shaped profile. The guide carriage 2 engages with its two limbs 4 around the guide rail 1.

The guide rail 1 has an upper side and, situated opposite one another, two longitudinal sides, with the longitudinal sides being provided in each case with a plurality of raceways 6, which are formed by ball grooves 5, for balls 7. The four ball grooves 5 of the guide rail 1 are arranged in an O-arrangement with one another.

The guide carriage 2 has, on its two limbs 4 on its sides which face toward the longitudinal sides of the guide rail 1, in each case two raceways 8 which face the raceways 6 and are likewise formed as ball grooves 9. The ball grooves 5, 9 of the guide rail 1 and of the guide carriage 2 delimit first and second load channels 10, 11 in which the balls 7 roll under load on the ball grooves 5, 9. Deflecting channels 12, 13 and return channels 14, 15, which are indicated by dashed lines, connect the start and end of the load channels 10, 11 to one another in a continuous manner.

If tensile forces engage on the guide carriage 2, which pull the guide carriage 2 upward away from the guide rail 1, the balls 7 of the first load channels 10 transmit the load. The load channel 10 accordingly has a tension raceway. If compressive forces act on the guide carriage 2, the second load channels transmit the load. The load channel 11 accordingly has a compression raceway.

Figure 2:
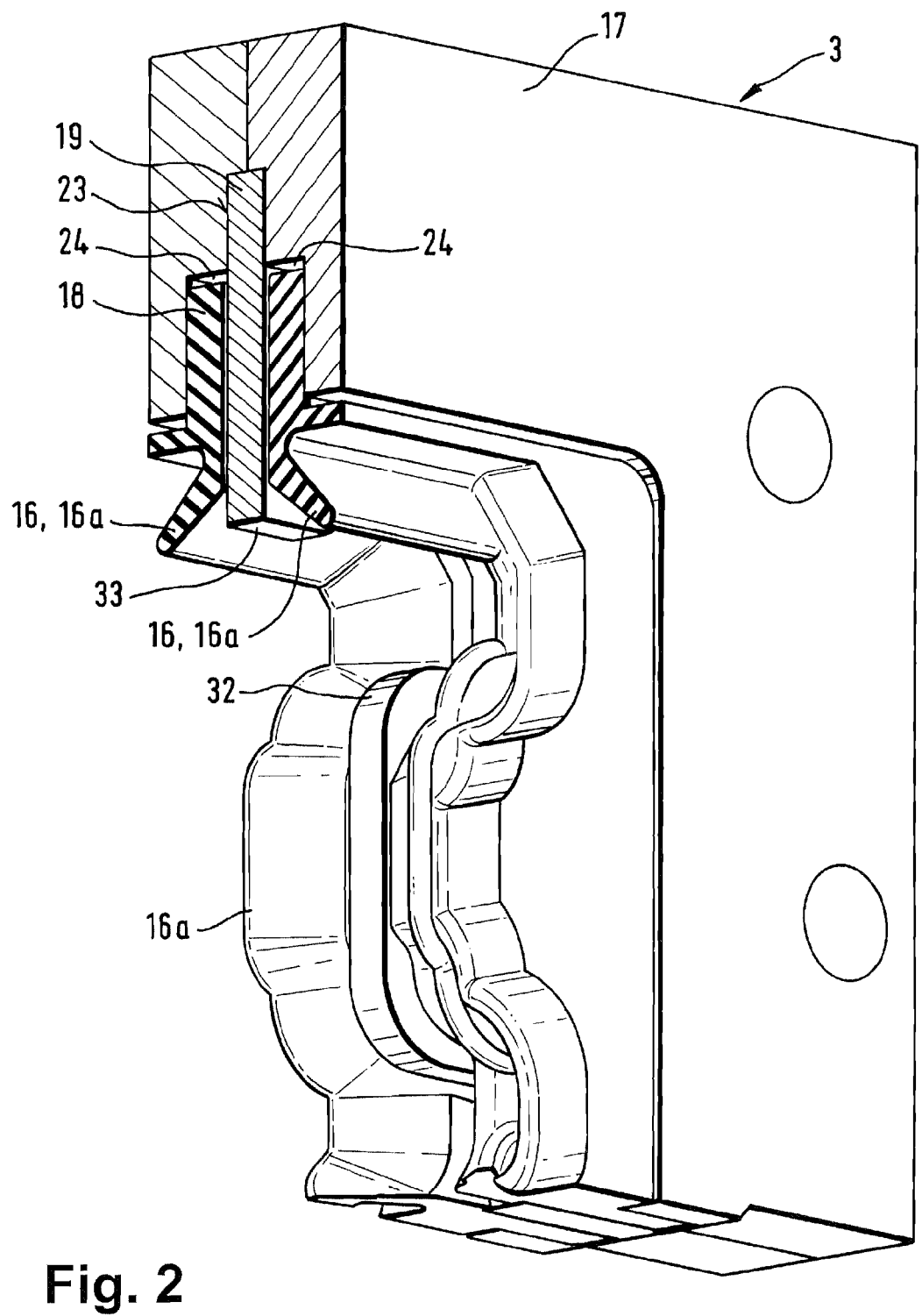
FIG. 2 shows the scraper from FIG. 1 in a perspective illustration and in section.

The scraper 3 is provided at its inner periphery with a scraping system 16 which is formed in the present case by a sealing lip 16a, as can be seen in particular from FIG. 2 which is described further below. The scraping system 16 is matched to the contour of the guide rail 1. The scraper 3 is in scraping contact, by means of its scraping system 16, with the upper side and with the two longitudinal sides of the guide rail 1.

Figure 1:
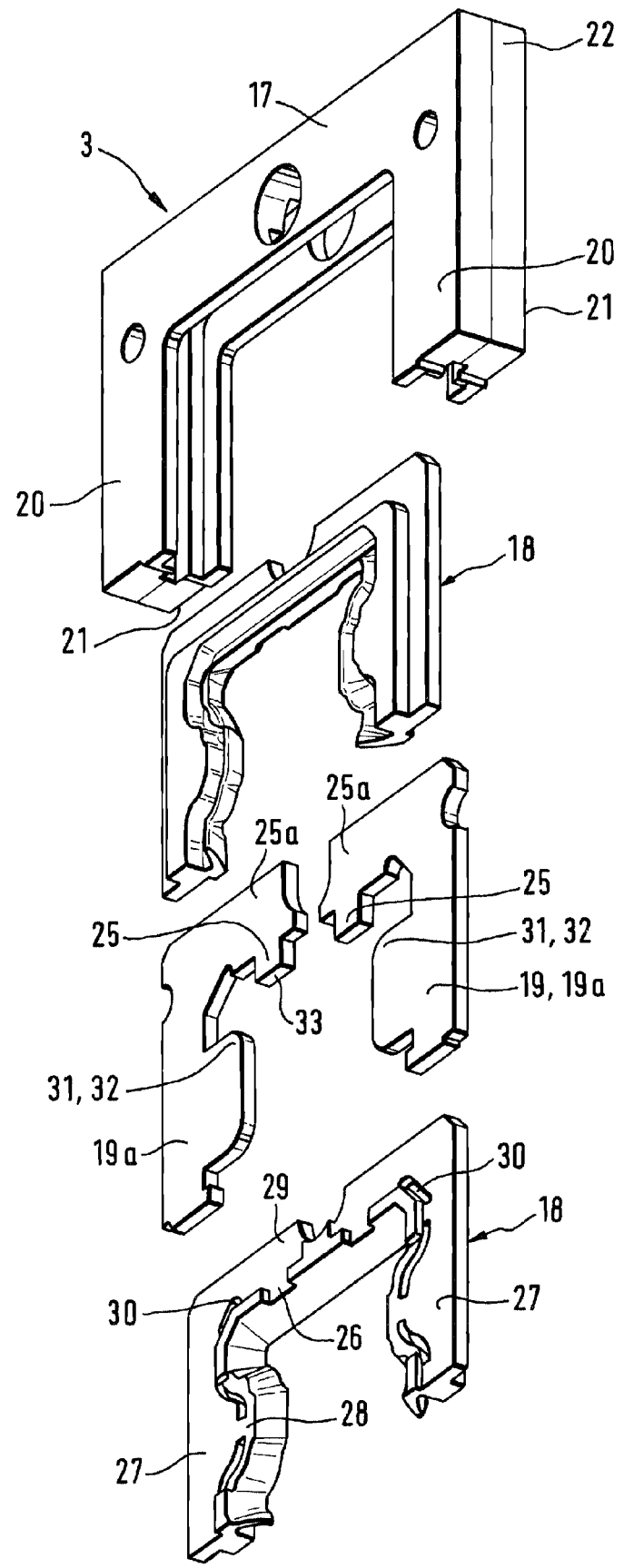
FIG. 1 shows a scraper according to the invention in an exploded illustration.
Figure 3:
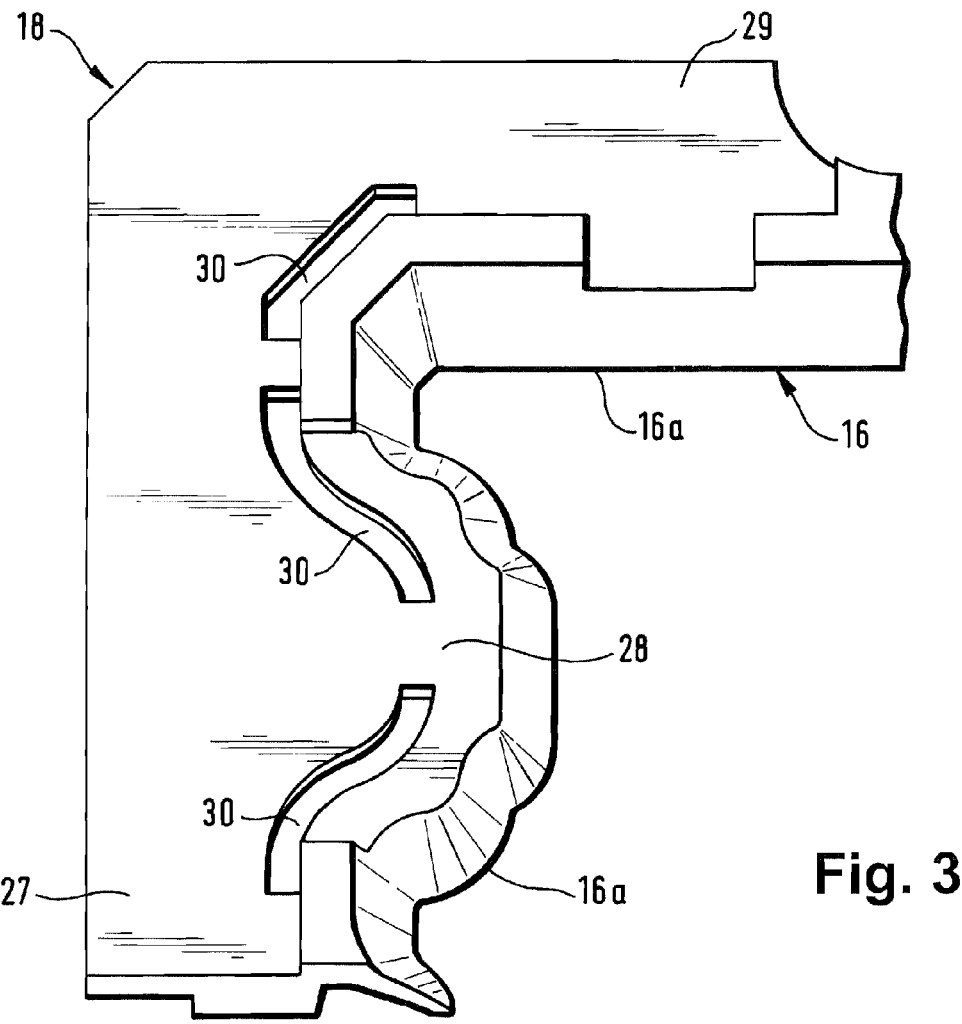
FIG. 3 shows a seal of the scraper as per FIG. 2 in a perspective and enlarged illustration.

The scraper 3 will now be described in detail below on the basis of FIGS. 1 to 3. FIG. 1 shows the individual parts of the scraper 3 according to the invention. In a housing 17, two plate-shaped seals 18, which are formed from flexible material, are arranged in series in the rail direction. Arranged between the two seals 18 is a support plate 19 against which the two seals 18 are supported by means of their sides which face toward the support plate 19.

The housing 17, as viewed in longitudinal section through the guide carriage 2, has an approximately u-shaped section profile which is open toward the guide rail 1. The two limb parts 20, 21 of the section profile form a front wall and a rear wall of the housing 17, with the rear wall facing toward the guide carriage 2. A base part 22, which connects the two limb parts 20, 21, forms a peripheral wall of the housing 17.

The housing 17 is provided with a first receptacle 23 for the support plate 19. When the support plate 19 is arranged correctly in the first receptacle 23, the support plate 19 is aligned positionally accurately in all spatial axes. FIG. 2 shows the first receptacle 23 with a rectangular cross section, with the first receptacle 23 being formed both in the base part 22 and also in the limb parts 20, 21.

The housing 17 is also provided with a second receptacle 24 for the two seals 18. The two second receptacles 24 are likewise depicted in FIG. 2. The second receptacles 24 are also formed here as rectangular recesses both in the base part 22 and in the limb parts 20, 21. When the seals 18 are held correctly in the second receptacles 24, the seals 18 are aligned positionally accurately in all spatial axes. The seals 18 are supported with their one end side on the front wall and on the rear wall of the housing 17, and with their other end side on the support plate 19. Even if one of the two seals 18 is removed, it is therefore ensured that the other, remaining seal 18 is held correctly and positionally accurately in the housing 17.

The plate-shaped seals 18 can be easily removed from the housing 17 and replaced with other seals. If the guide carriage 2 with the mounted scraper 3 is arranged on the guide rail 1, it is necessary merely for the scraper 3 to be detached from the guide carriage 2. The housing 17 of the scraper 3 can then be removed from the guide rail 1 upward. The two seals 18 and the support plate 19 can initially remain on the guide rail 1. Since the two seals 18 are preferably formed from a flexible material, the seals can be bent such that they can be removed from the guide rail 1. New seals can then be placed on, and the housing can be placed back on again.

The seals 18 and the support plate 19 are additionally connected to one another in a form-fitting manner. As can be seen from FIG. 1, the support plate 19 is provided with two projections 25. The two projections 25 are formed in each case on a transverse web 25*a* of the limb 19*a* of the support plate 19. The two seals 18 are provided with in each case two recesses 26, with the projections 25 of the support plate 19 engaging into the recesses 26 of the two seal. The depth of the recesses 26 is approximately half of the thickness of the support plate 19. Since the two seals 18 are arranged to both sides of the support plate 19, it is accordingly possible for the two projections 25 of the support plate 19 to engage both into the recesses 26 of the one and of the other seal 18. The support plate 19, which in the present case is of two-part design, can also be of single-part design. The two transverse webs 25*a* of the support plate 19 are then connected to one another in one piece.

In the four-row linear rolling bearing with an O-arrangement illustrated here, the ball grooves 5, 9 on the guide rail 1 are arranged in such a way that the two limbs 27 of the seal 18, which is of u-shaped design, are provided at their sides which face toward one another in each case with a projecting lug 27. FIG. 3 shows a part of the seal 18 in a perspective illustration with the lug 28. It can also be clearly seen from the figure that the sealing lip 16*a* is matched to the contour of the guide rail 1, so that the sealing lip 16*a* is correctly in scraping contact with the guide rail 1.

Between the lug 28 and the transverse web 29, which connects the two limbs 27, of the seal 18, the sealing lip 16*a* undergoes pronounced deflections along its contour. In this way, shape-related points of increased stiffness are formed along the extent of the sealing lip 16*a*. Since it is however advantageous if the contact pressure of the sealing lip 16*a* against the guide rail 1 is uniform, targeted material weakenings are provided on the seal 18 at the points of increased stiffness. The targeted material weakenings are formed in the exemplary embodiment in that, at the points of increased stiffness, a plurality of recesses are provided, which recesses extend through the seal 18 and form slots 30. The slots 30 are arranged at a small distance from the sealing lips 16*a*. The sealing lips 16*a* are accordingly not supported at the points, and can be compressed resiliently in the direction of the slots 30. It is possible in this way to ensure uniform pressure of the scaling lip 16*a* along the entire extent in a targeted manner.

The slots 30 are provided both in the region of the lugs 28 and in the region of corners which are formed by the two limbs 27 and the transverse web 29.

If seals 18 for linear rolling bearings of the type are to be mounted on the guide carriage 2, it is to be ensured that the seals 18 are aligned correctly with respect to the guide rail 2. Correct scraping contact of the scraper 3 against the guide rail 1 is otherwise not ensured. Positionally accurate alignment of the seal 18 be it here with scrapers with or without a housing—is complicated by the acting elastic restoring forces of the sealing lip 16*a* which bears against the guide rail 1, as is explained below. If one imagines that the sealing lip 16*a* in the region of the transverse web 29 is removed, then there is no contact of the seal against the guide rail 1 on the upper side of the guide rail 1. Only the two limbs 27 with their sealing lip 16*a* are then in scraping contact against the guide rail 1. In this case, the sealing lips 16*a* are compressed resiliently against the longitudinal sides of the guide rail 1. The acting pressure forces of the sealing lips 16*a* at both sides of the guide rail 1 are in force equilibrium, so that in this situation, correct alignment of the seal 18 in relation to the guide rail 1 is given.

In reality, however, additional elastic restoring forces of the sealing lip 16*a* act in the region of the transverse web 29, so that the seal 18 is resiliently forced or pulled upward away from the guide rail 1. This means that the sealing lips 16*a*, in the region of the lugs 28, are pressed to an increased degree against the ball groove 5, which forms the tension raceway, of the first rolling body channel 10 of the guide rail 1.

If the scraper 3 is fixed to the guide carriage 2 in this impermissible alignment, then the sealing lip 16*a* is subjected to increased wear, so that a reliable scraping action is not ensured. In order to ensure that no impermissible deformation of the sealing lip can occur when mounting the scraper onto the guide carriage, the scraper 3 is provided with a stop 31, as is shown in FIG. 1 with regard to the support plate 19. The stop 31 is provided for abutment against the ball groove 5, of the guide rail 1, of the first rolling body channel.

It can be seen from FIG. 1 that the stop 31 is formed on a lug 32. The support plate 19 has the integrally formed lugs 32 in each case on its two limbs. It can be seen from FIG. 2 that the sealing lip 16*a* projects slightly beyond the lug 32. If the seal 18 is positioned correctly with respect to the guide rail 1, it is therefore ensured that the lug 32 is out of contact with the guide rail 1. If, on account of the acting restoring forces of the sealing lip 16*a* against the upper side of the guide rail 1, the scraper 3 which has not yet been fixed to the guide carriage 2 is pulled upward, then this can occur only until the lug 32 abuts against the guide rail 1. In this abutment situation, it is ensured that the sealing lip 16*a* is not impermissibly deformed. A technician carrying out the assembly can additionally easily determine, on account of the abruptly increased resistance, that the stop 31 is already bearing against the guide rail 1.

The scraper 3 is provided with a further stop 33. The stop 33 is formed on the projection 25, as already described further above, of the support plate 19. The sealing lip 16*a* projects beyond the stop 33 in the direction of the upper side of the guide rail 1. If, while being mounted onto the guide carriage 2, the scraper 3 is pressed too far downward, then the stop 33 abuts against the upper side of the guide rail 1. On account of the stop 33, the sealing lip 16*a* which bears against the upper side is not pressed impermissibly intensely against the upper side, and is therefore not damaged. Between the two described abutment situations, the scraper 3 is positioned correctly, preferably in a central position, and can be fixed to the guide carriage 2.

LIST OF REFERENCE SYMBOLS

1 Guide rail
2 Guide carriage
3 Scraper
4 Limb
5 Ball groove
6 Raceway
7 Ball
8 Raceway
9 Ball groove
10 First load channel
11 Second load channel
12 Deflecting channel
13 Deflecting channel
14 Return channel
15 Return channel
16 Scraping system
16*a* Sealing lip 17 Housing
18 Seal
19 Support plate
19a Limb
20 Limb part
21 Limb part
22 Base part
23 First receptacle
24 Second receptacle
25 Projection
25a Transverse web
26 Recess
27 Limb
28 Lug
29 Transverse web
30 Slot
31 Stop
32 Lug
33 Stop

The invention claimed is:

1. A linear rolling bearing, comprising:
a guide carriage, which is mounted by means of rolling bearings on a guide rail; and
a scraper, arranged at least one end side of the guide carriage, for scraping foreign objects from the guide rail, the scraper being in scraping contact, by means of a scraping system with the guide rail,
wherein the scraper has a first stop for abutment against the guide rail, the abutment of the first stop indicating an impermissible position of the scraper on the guide rail,
wherein the guide carriage is of approximately u-shaped design and engages with two limbs around the guide rail which has an upper side and, situated opposite one another, two longitudinal sides, with the two longitudinal sides being provided with raceways for rolling bodies which, together with raceways provided on the limbs of the guide carriage, delimit load channels for the rolling bodies, with the scraper being in scraping contact, by means of the scraping system, with the longitudinal sides and with the upper side of the guide rail, and
wherein the first stop is designed for abutment against the raceway of the guide rail of the first or of the second load channel.

2. The linear rolling bearing according to claim 1, wherein the scraper has a second stop for abutment against the guide rail, with the abutment of the second stop indicating an impermissible position of the scraper on the guide rail.

3. The linear rolling bearing according to claim 2, wherein the first stop and the second stop act in a common plane, orthogonal to one another, and the first stop and the second stop are arranged transversely with respect to the guide rail.

4. The linear rolling bearing according to claim 3, wherein the support plate and the seal engage into one another in a form-fitting manner at least one point.

5. The linear rolling bearing according to claim 1, wherein the scraping system projects towards the guide rail beyond the first step.

6. The linear rolling bearing according to claim 1, wherein the longitudinal sides of the guide rail and the two limbs of the guide carriage have a plurality of raceways for rolling bodies, which face one another, delimiting load channels.

7. The linear rolling bearing according to claim 1, wherein tensile loadings of the guide carriage are transmitted by rolling bodies into the first load channel, and compressive loadings of the guide carriage are transmitted by the rolling bodies into the second load channel.

8. The linear rolling bearing according to claim 1, wherein the approximately u-shaped scraper is in scraping contact, by means of the two limbs, with the longitudinal sides of the guide rail, and, by means of a transverse web which connects the two limbs, with the upper side of the guide rail.

9. The linear rolling bearing according to claim 1, wherein the scraper has a plate-shaped seal which is provided with the scraping system.

10. The linear rolling bearing according to claim 9, wherein the scraper has a rigid support plate as a support for the seal which is formed from flexible material.

11. The linear rolling bearing according to claim 10, wherein the support plate is provided with the first and with the second stop.

12. The linear rolling bearing according to claim 11, wherein the seal and the support plate each have limbs with lugs which project projecting toward one another and the lugs of the support plate are provided with the first stop.

13. The linear rolling bearing according to claim 12, wherein the lugs of the seal are in scraping contact, by means of the scraping system, with the raceways of the guide rail.

14. The linear rolling bearing according to claim 11, wherein the support plate is provided with the second stop on a transverse web which engages over the guide rail at the upper side.

15. A scraper for a linear rolling bearing having a guide carriage, which is mounted by means of rolling bearings on a guide rail, the scraper, comprising:
a housing with a U-shaped profile having a front part and a rear part, a first receptacle and two second receptacles on each side of the first receptacle, the front part and the rear part each having two limbs parts which are each connected by a base part, and the first receptacle and the second receptacles being recesses having rectangular cross-sections;
a support plate arranged in the first receptacle and comprising two identical parts that mirror each other, each of the parts having a projection with a stop formed on a transverse web, two limb, which are connected by and adjacent to the transverse web, and integrally formed on each of the limbs is a lug having a stop;
seals, which are arranged on each side of the support plate in the second receptacles, the seals each having a transverse web with recesses, two limbs, which are connected by and adjacent to the transverse web and slots, the projections of the support plate engage into the recesses of the seals, the limbs each have lugs protruding inwardly toward each other, and the slots, which extend through the seals, are arranged in regions of the lugs and corners formed by the limbs and the transverse web near an inner periphery of the seals, and at the inner periphery of the seals is a scraping system, which matches the contour of the guide rail on which the scraper is fastened, and the scraping system on each of the seals has a sealing lip.

* * * * *